United States Patent
Lay

(10) Patent No.: US 7,428,463 B2
(45) Date of Patent: Sep. 23, 2008

(54) SYSTEM AND METHOD FOR ADAPTIVE FLOW CONTROL

(75) Inventor: Jiann-Jyh (James) Lay, Kaohsiung (TW)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/756,515

(22) Filed: Jan. 14, 2004

(65) Prior Publication Data

US 2005/0033531 A1 Feb. 10, 2005

Related U.S. Application Data

(60) Provisional application No. 60/492,986, filed on Aug. 7, 2003.

(51) Int. Cl.
*G01L 7/00* (2006.01)

(52) U.S. Cl. .................................................... 702/55

(58) Field of Classification Search ............ 702/55, 702/51; 370/400, 352, 389, 254, 230, 229, 370/403, 236, 468; 706/15; 709/224, 203, 709/221, 233; 379/10, 201
See application file for complete search history.

(56) References Cited

U.S. PATENT DOCUMENTS

| | | | | |
|---|---|---|---|---|
| 5,857,147 | A * | 1/1999 | Gardner et al. | 455/67.11 |
| 6,470,025 | B1 * | 10/2002 | Wilson et al. | 370/462 |
| 6,570,848 | B1 * | 5/2003 | Loughran et al. | 370/230.1 |
| 2002/0161914 | A1 * | 10/2002 | Belenki | 709/235 |
| 2003/0154272 | A1 * | 8/2003 | Dillon et al. | 709/223 |
| 2004/0010588 | A1 * | 1/2004 | Slater et al. | 709/224 |
| 2004/0136379 | A1 * | 7/2004 | Liao et al. | 370/395.21 |

OTHER PUBLICATIONS http://en.wikipedia.org/wiki/Leaky_bucket, p. 1-3.*

* cited by examiner

*Primary Examiner*—Tung S Lau
(74) *Attorney, Agent, or Firm*—Squire, Sanders & Dempsey L.L.P.

(57) ABSTRACT

The system and method for adaptive flow control transmits pause off packets to network nodes after a calculated time based on switch resource usage thereby alleviating congestion is a network switching system. The method includes measuring a resource usage level in a network switching system, incrementing a register based on the measurement if the measurement exceeds a predetermined level, decrementing the register at a constant rate, and generating a pause off packet when the register is decremented to or below a prespecified level.

15 Claims, 2 Drawing Sheets

SYSTEM AND METHOD FOR ADAPTIVE FLOW CONTROL

PRIORITY REFERENCE TO PRIOR APPLICATION

This application claims benefit of and incorporates by reference U.S. Patent application No. 60/492,986, entitled "Adaptive Flow Control," filed on Aug. 7, 2003, by inventor Jiann-Jyh (James) Lay.

BACKGROUND OF THE INVENTION

1. Technical Field

This invention relates generally to switches, and more particularly, but not exclusively, to a system and method for adaptively controlling traffic flow within a network system to limit network switching system congestion.

2. Description of the Related Art

Networks, such as local area networks (i.e., LANs) and wide area networks (i.e., WANs, e.g., the Internet), enable a plurality of nodes to communicate with each other. Nodes can include computers, servers, storage devices, mobile devices, PDAs, wireless telephones, etc. Networks can include the nodes themselves, a connecting medium (wired, wireless and/or a combination of wired and wireless), and network switching systems such as routers, hubs and/or switches.

The network switching systems route traffic between various nodes of the network. However, in certain circumstances the network switching systems may not be able to instantaneously route traffic to a certain node. For example, if several nodes are transmitting data to a single node, a network switching system may become overloaded with respect to that one node. In another example, the receiving node may be unable to receive data as fast the transmitting node is transmitting the data. To overcome this difficulty, network switching systems use receiving and transmit queues (or buffers) to temporarily store received data. However, these queues can also become overloaded.

When network switching system queues and other network switching system resources become congested according to a resource usage measurement, conventional network switching systems transmit pause on packets to the networks nodes that are causing the congestion because of excessive packet transmission. The transmitted pause on packets cause the transmitting nodes to temporarily cease transmitting data. Once the congestion decreases to a predetermined level, the network switching systems transmit pause off packets to the network nodes that received the pause on packets, which enables the network nodes to begin transmitting again.

However, because the pause on and pause off packets are transmitted based on only sequential resource usage measurements, the pause on and off conditions tend to cycle back and forth rapidly, thereby not fully alleviating the congestion condition or not alleviating the congestion condition for any meaningful amount of time. Further, conventional network switching systems only measure resource congestion as it relates to unicast packets. Accordingly, in some instances, network nodes can monopolize network switching systems by transmitting multicast and broadcast packets. An additional drawback of conventional switching systems is that they use asynchronous loopback logic, which can cause complications because the underpinning of network switching systems is generally based on synchronous design.

Therefore, a new system and method are needed that alleviates these problems.

SUMMARY OF THE INVENTION

Embodiments of the invention provide a system and method for controlling resource usage in a network switching system by transmitting pause off packets to network nodes after a calculated time based on resource usage measurements. Advantages of the system and method include increasing the utilization of the network switching system by limiting traffic from network nodes causing congestion; improving fairness since the system and method work for unicast, multicast and broadcast packets by ignoring the type of packet; and simplifies pause off/on logic by eradicating asynchronous loopback logic.

In an embodiment of the invention, the method comprises: measuring a resource usage level in a network switching system; incrementing a register based on the measurement if the measurement exceeds a predetermined level; decrementing the register at a constant rate; and generating a pause off packet when the register is decremented to or below a pre-specified level.

In an embodiment of the invention, the system comprises a resource measurement engine; a register increment engine; a register decrement engine; and a pause off engine. The resource measurement engine measures resource usage in a network switching system. The register increment engine, which communicatively coupled to the resource measurement engine and a register, increments the register based on a resource usage measurement. The register decrement engine, which is communicatively coupled to the register, decrements the register at a constant rate. The pause off engine, which is communicatively coupled to the register, generates a pause off packet when the register is decremented to or below a pre-specified level.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
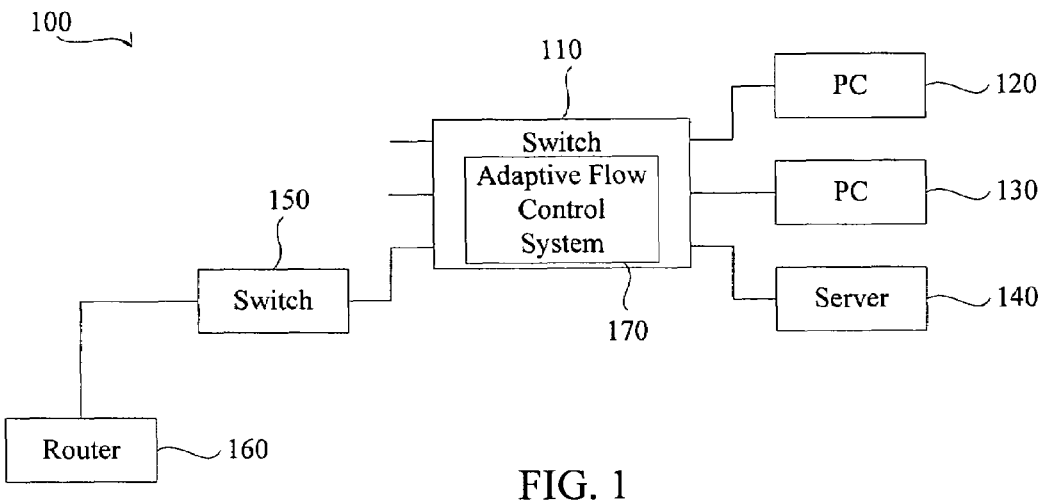
FIG. 1 is a block diagram illustrating a network system in accordance with an embodiment of the present invention.

FIG. 1 is a block diagram illustrating a network system 100 in accordance with an embodiment of the present invention.

The network system 100 includes 6 nodes: PCs 120 and 130, a server 140, a switch 110, a switch 150, and a router 160. The switch 150, the PC 120 and 130, and the server 140 are each communicatively coupled, via wired or wireless techniques, to the switch 110. The router 160 is communicatively coupled, via wired or wireless techniques, to the switch 150. It will be appreciated by one of ordinary skill in the art that the network system 100 can include additional or fewer nodes and that the network system 100 is not limited to the types of nodes shown. For example, the switch 110 can be further communicatively coupled to network clusters or other networks, such as the Internet.

The switch 110 includes an adaptive flow control system 170, which generates and transmits pause on and pause off packets to nodes that are causing congestion on the network system 100. In an embodiment of the invention, the adaptive flow control system 170 transmits the pause on packets to network nodes causing congestion but transmits pause off packets to all network nodes so that it does not need to keep track of which network nodes received transmitted pause on packets, thereby eliminating asynchronous loopback logic. For example, if the server 140 is causing congestion by transmitting a significant amount of packets to the switch 110, the adaptive flow control system will transmit a pause on packet to the server 140 to indicate to the server 140 to stop transmitting packets until it receives a pause off packet from the adaptive flow control system 170.

An advantage of the adaptive flow control system 170 over the conventional art is that the pause off packets can be transmitted to network nodes at variable times after transmission of the pause on packets. The time to transmit the pause off packets is a function of resource usage. Accordingly, if resource usage is high, the pause off packets can be transmitted after a longer period of time than if resource usage is relatively lower. The adaptive flow control system 170 will be discussed in further detail in conjunction with FIG. 2-FIG. 4 below.

Figure 2:
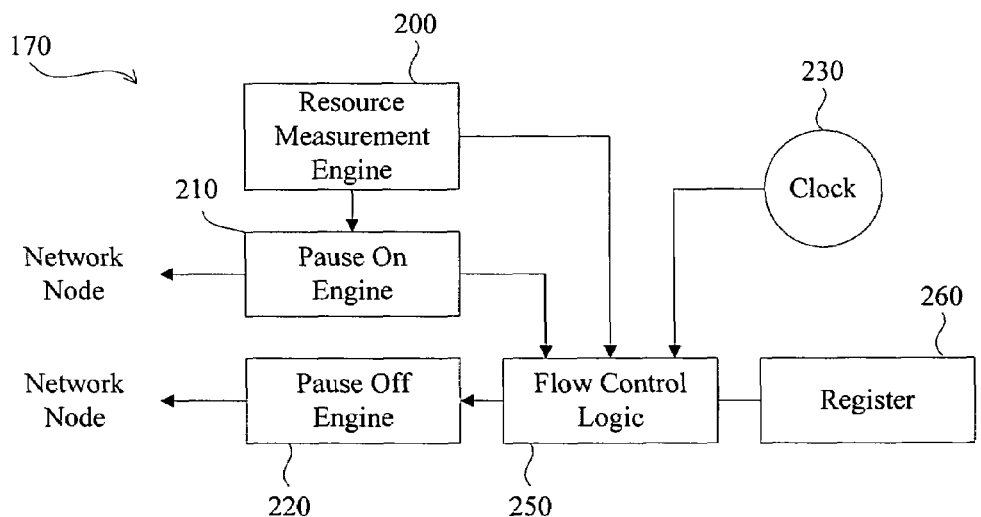
FIG. 2 is a block diagram illustrating an adaptive flow control system of FIG. 1.

FIG. 2 is a block diagram illustrating an adaptive flow control system 170 (FIG. 1). The adaptive flow control system 170 can be implemented as software, as an application specific integrated circuit (ASIC) or via other techniques or combinations of techniques. Each port of the switch 110 can include an adaptive flow control system 170 or the adaptive flow control system 170 can be a single global system for each of the ports of the switch 110.

The adaptive flow control system 170 includes a resource measurement engine 200, a pause on engine 210, a pause off engine 220, a clock 230, flow control logic 250 and a register 260. The resource measurement engine 200 is communicatively coupled to the pause on engine 210, which is communicatively to either a single network node or a plurality of network nodes. If the adaptive flow control system 170 is a single global system for the switch 110, then the pause on engine 210 is communicatively coupled to each network node. Otherwise, if the switch 110 comprises a plurality of systems 170 (one for each network node) then the pause on engine 210 is only communicatively coupled to a single network node.

The clock 230 is communicatively coupled to the flow control logic 250. The flow control logic 250 is communicatively coupled to the register 260, the clock 230, and the pause off engine 220. The register 260 includes a countdown register that is decremented at a consistent rate by the flow control logic 250 and incremented according to measurements made by the resource measurement engine 200, as will be discussed in further detail in conjunction with FIG. 3 and FIG. 4 below. When the register 260 is decremented to or below a pre-specified level (e.g., 0), the flow control logic 250 causes the pause off engine 220 to transmit a pause off packet to the network it is communicatively coupled to.

In an embodiment of the invention, the resource measurement engine 200 measures resource usage including port receiving buffers, destination buffers, total resource usage, and/or other factors of the switch 110. Once a certain predetermined congestion status is reached based on a specific port usage and other values, the resource measurement engine 200 communicates with the pause on engine 210, which in turn transmits a pause on packet to the network node or nodes causing the congestion. In an alternative embodiment, the pause on engine 210 can transmit a pause on packet to all network nodes.

A register increment engine 310 (FIG. 3) of the flow control logic 250, using the resource management engine 200 measurement, determines how much to increment the register 260 by (which can include a global register, a register associated with a specific port, or a section of a register associated with a specific port). A high measurement will cause the register increment engine 310 to increment the register 260 by a large number e.g., 2048) while a small measurement will cause the register increment engine 310 to increment the register 260 by a smaller number (e.g., 84). A register decrement engine 300 of the flow control logic 250 decrements the register 260 at a constant rate based on clock signals from the clock 230. The flow control logic 250 and its components will be discussed in further detail below in conjunction with FIG. 3.

When register 260 (or section thereof) is decremented to 0, then the pause off engine 220 transmits a pause off packet to the network node associated with the register 260 or section thereof that is the cause of the congestion.

Figure 3:
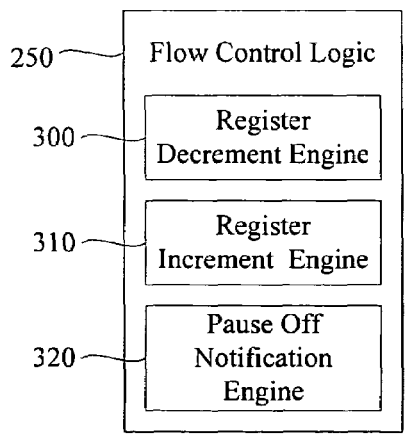
FIG. 3 is a block diagram illustrating flow control logic of the adaptive flow control system.

FIG. 3 is a block diagram illustrating the flow control logic 250 of the adaptive flow control system 170. The flow control logic 250 includes a register decrement engine 300, a register increment engine 310, and a pause off notification engine 320. The register decrement engine 300, as mentioned above, decrements the register 260 at a constant rate using signals from the clock 230. If there are a plurality of registers 260 or plurality of sections of the register 260, then the register decrement engine 300 decrements all of the registers 260 or all of the sections of the register 260 at the same constant rate.

The register increment engine 310 increments the register 260 according to measurements made by the resource measurement engine 200. If measurements continue to increase, the register increment engine 310 can increment the register 260 more than the previous increment. If there is a plurality of registers or sections of registers corresponding with the plurality of ports of the switch 110, the register increment engine 310 can increment the registers or sections according to the measurements made for each receiving port. For example, a network node causing congestion by transmitting substantially more packets than other network nodes would have a higher resource measurement than other network nodes. Accordingly, the register increment engine 310 would increment the register or register section associated with the port associated with that node more than it would increment the other registers or register sections.

The pause off notification engine 320 notifies the pause off engine 220 whenever the register 260 has been decremented to zero (or other pre-specified level). The pause off engine 220 in turn then transmits pause off packets to all nodes if the register 260 is global or to only the network node associated with the register or register section if each port has a register or register section associated with it.

In another embodiment of the invention, the register decrement engine 300 can decrement the register 260, sections thereof, or a plurality of registers at a variable rate. For example, the register decrement engine 300 can decrement the register 260 at a rate inversely proportional to overall switch 110 resource usage. In another embodiment, the register decrement engine 300 can decrement a register 260 section or a register associated with a specific port at a rate inversely proportional to that specific port's usage. Accordingly, the more congestion there is, the longer it will take to decrement the register 260 to zero and therefore transmit a pause off packet.

Figure 4:
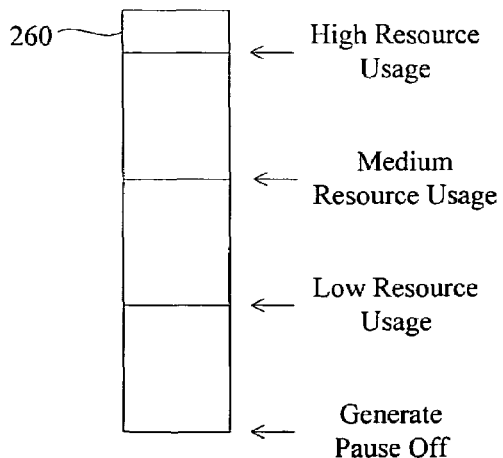
FIG. 4 is a block diagram illustrating a register of the adaptive flow control system.

FIG. 4 is a block diagram illustrating the 260 of the adaptive flow control system 170. Each receiving port of the switch 110 can have a register 260 or section thereof associated with it in which each register 260 represents congestion at that port and/or other congestion in the switch 110. In another embodiment of the invention, the register 260 can be global and represent overall congestion in the switch 110.

As discussed above, the register increment engine 310 increments the register 260 in proportion to the measurement made by the resource measurement engine 200. The higher the measurement, the higher the congestion in the switch 10 and therefore the higher incrementing of the register 260. As the register 260 is decremented at a constant rate, the higher the value of the register 260, the longer it will take to decrement to zero, at which point the pause off notification engine 320 notifies the pause off engine 220 to transmit a pause off packet to the network node associated with the register 260, thereby enabling the network node to restart transmitting packets to the switch 110.

Figure 5:
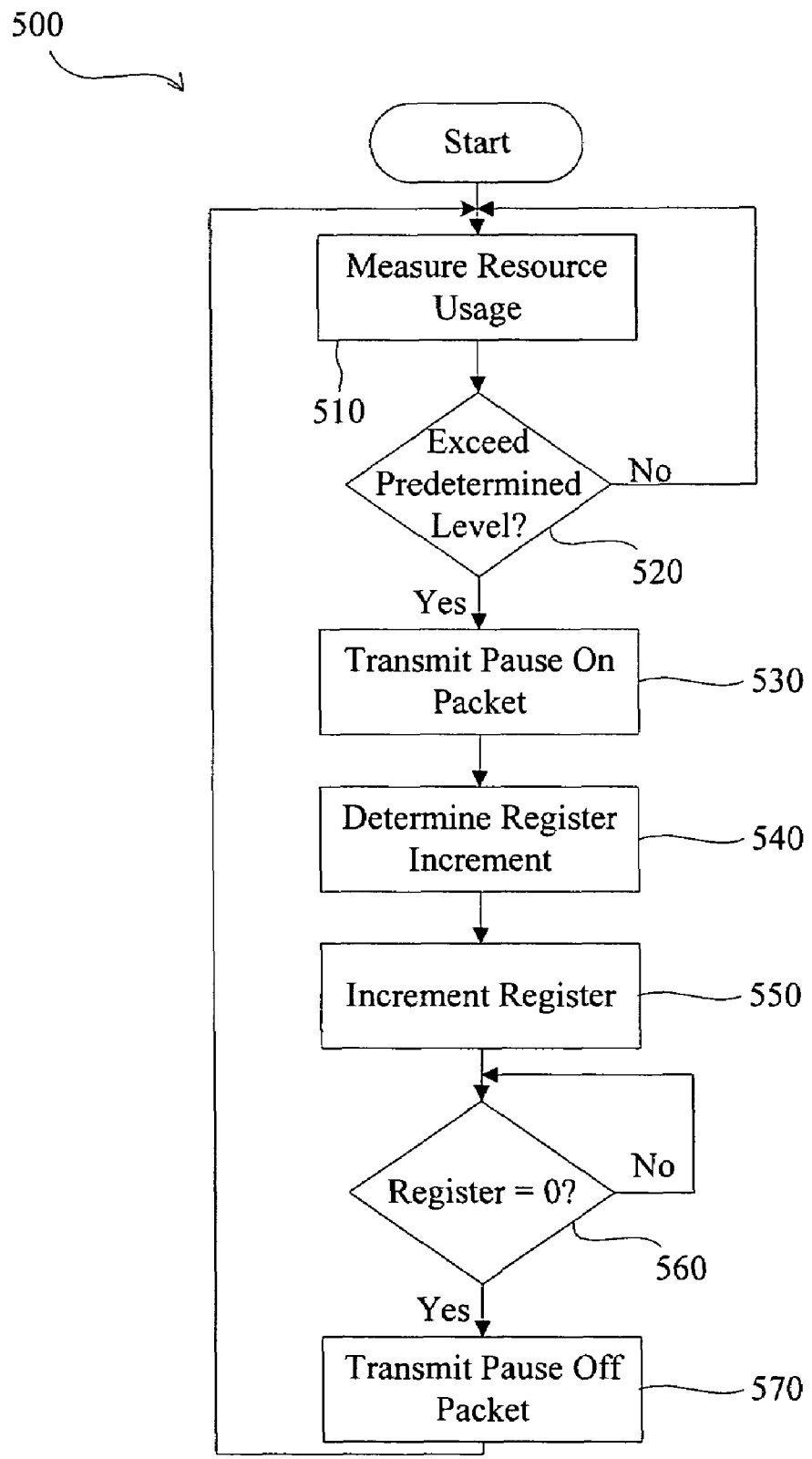
FIG. 5 is a flowchart illustrating a method for measuring resource usage.

FIG. 5 is a flowchart illustrating a method 500 for measuring resource usage. In an embodiment of the invention, the adaptive flow control system 170 executes the method 500. Further, the adaptive flow control system 170 can execute multiple instances of the method 500 substantially simultaneously or sequentially. During execution of the method 500, the register 260 is decremented at a constant rate.

First, resource usage is measured (510). The measurement (510) can include port receiving buffers, transmission buffers, and other resources in the switch 110. In an embodiment of the invention, only receiving buffers at a specific port are measured. In another embodiment, other resources in the switch 110 can also be measured. Next, it is determined (520) if the measured resource usage exceeds a predetermined level. If the measured resource usage does exceed the predetermined level, than a pause on packet is generated (530) and transmitted to the network node or nodes that are causing the excessive resource usage. If the measured resource usage does not exceed the predetermined level, then the method 500 repeats starting with the measuring (510).

If a pause on packet was generated and transmitted (530), then a register increment is then determined (540) and the register 260 is then incremented (550) by the determined amount. The determination (540) is based on resource usage measurements and can also be based on a comparison with past resource usage measurements. If resource usage measurements indicate an increase in resource usage over time, then the determined increment can be higher than previously determined increments.

It is next determined (560) if the register 260 has been decremented to zero or other pre-specified level. If the register 260 has not yet been decremented to zero, then the determining (560) repeats until the register 260 hits zero. Once the register 260 reaches zero, a pause off packet is then transmitted (570) to a network node. The method 500 then repeats beginning with the measuring (510). The method 500 ends when the switch 110 is powered off.

The foregoing description of the illustrated embodiments of the present invention is by way of example only, and other variations and modifications of the above-described embodiments and methods are possible in light of the foregoing teaching. Components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
   measuring a resource usage level in a network switching system;
   incrementing a register based on the measurement if the measurement exceeds a predetermined level;
   decrementing the register at a constant rate; and
   generating a pause off packet when the register is decremented to or below a pre-specified level, thereby controlling when a node is allowed to transmit packets on the network, wherein the pause off packet is for instructing a network node to resume packet transmission.

2. The method of claim 1, further comprising transmitting the pause off packet to a network node associated with the register.

3. The method of clam 1, wherein the incrementing also increments the register based on prior resource usage measurements.

4. The method of claim 1, wherein the measuring measures receiving port buffer usage.

5. The method of claim 1, wherein the measuring measures transmission port buffer usage.

6. The method of claim 1, wherein the incrementing is proportional to the measurement.

7. The method of claim 1, further comprising transmitting the pause off packet to all network nodes.

8. A system, comprising:
   means for measuring a resource usage level in a network switching system;
   means for incrementing a register based on the measurement if the measurement exceeds a predetermined level;
   means for decrementing the register at a constant rate; and
   means for generating a pause off packet when the register is decremented to or below a pre-specified level, thereby controlling when a node is allowed to transmit packets on the network, wherein the pause off packet is for instructing a network node to resume packet transmission.

9. A system, comprising:
   a resource measurement engine capable of measuring resource usage in a network switching system;
   a register increment engine, communicatively coupled to the resource measurement engine and a register, capable of incrementing the register based on a resource usage measurement;
   a register decrement engine, communicatively coupled to the register, capable of decrementing the register at a constant rate; and
   a pause off engine, communicatively coupled to the register, capable of generating a pause off packet when the register is decremented to or below a pre-specified level, thereby controlling when a node is allowed to transmit packets on the network, wherein the pause off packet is for instructing a network node to resume packet transmission.

10. The system of claim 9, wherein the pause off engine is further capable of transmitting the pause off packet to a network node associated with the register.

11. The system of clam 9, wherein the register increment engine is also capable of incrementing the register based on prior resource usage measurements.

12. The system of claim 9, wherein the resource usage includes receiving port buffer usage.

13. The system of claim 9, wherein the resource usage includes transmission port buffer usage.

14. The system of claim 9, wherein the register incrementing engine increments the register in proportion to the measurement.

15. The system of claim 9, wherein the pause off engine is further capable of transmitting the pause off packet to all network nodes.

* * * * *